United States Patent
Aoki et al.

(10) Patent No.: US 7,613,333 B2
(45) Date of Patent: Nov. 3, 2009

(54) INDIVIDUAL AUTHENTICATION SYSTEM, INDIVIDUAL AUTHENTICATION METHOD, AND INDIVIDUAL AUTHENTICATION PROGRAM

(75) Inventors: Takahiro Aoki, Kawasaki (JP); Masaki Watanabe, Kawasaki (JP); Toshio Endoh, Kawasaki (JP); Mitsuaki Fukuda, Kawasaki (JP); Shigeru Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 618 days.

(21) Appl. No.: 11/226,306

(22) Filed: Sep. 15, 2005

(65) Prior Publication Data

US 2006/0285726 A1    Dec. 21, 2006

(30) Foreign Application Priority Data

Jun. 20, 2005    (JP)    ............................... 2005-178832

(51) Int. Cl.
*G06K 9/00*    (2006.01)
(52) U.S. Cl. ..................................... 382/115
(58) Field of Classification Search ................. 382/115, 382/117, 118, 124, 209, 215, 218; 340/5.52, 340/5.53, 5.8, 5.82, 5.83, 5.84; 704/246; 713/186; 902/3
See application file for complete search history.

(56) References Cited

U.S. PATENT DOCUMENTS

| | | | |
|---|---|---|---|
| 6,757,410 B1 * | 6/2004 | Nakashima | 382/124 |
| 6,836,554 B1 | 12/2004 | Bolle et al. | |
| 7,110,581 B2 * | 9/2006 | Xia et al. | 382/124 |
| 7,120,607 B2 * | 10/2006 | Bolle et al. | 705/64 |
| 7,184,576 B2 * | 2/2007 | Kono et al. | 382/115 |
| 2006/0136743 A1 * | 6/2006 | Polcha et al. | 713/186 |

FOREIGN PATENT DOCUMENTS

| | | |
|---|---|---|
| JP | 2000-76195 | 3/2000 |
| JP | 2002-169781 | 6/2002 |

* cited by examiner

*Primary Examiner*—Daniel G Mariam
(74) *Attorney, Agent, or Firm*—Fujitsu Patent Center (57) ABSTRACT

The present invention has been made to provide a technique capable of easily preventing the third party from misusing the data related to an individual physical feature in the case where individual authentication is performed based on the physical feature.

An individual authentication system that authenticates an individual based on his or her physical feature comprises an authentication information acquisition section that acquires, at the time of authentication of an individual, information related to a state in which predetermined processing has applied to predetermined physical feature of the individual as authentication information for authentication determination; a registration information acquisition section that acquires the previously registered information related to a state in which predetermined processing has applied to predetermined individual physical feature as registration information for authentication; and an authentication determination section that determines authentication of the authentication information acquired by the authentication information acquisition section based on the registration information acquired by the registration information acquisition section.

20 Claims, 10 Drawing Sheets

| INPUT CONDITION ID | LED1 | LED2 | LED3 | LED4 |
|---|---|---|---|---|
| 1 | 50% | 100% | 100% | 100% |
| 2 | 100% | 50% | 100% | 100% |
| 3 | 100% | 100% | 50% | 100% |
| 4 | 100% | 100% | 100% | 50% |

INDIVIDUAL AUTHENTICATION SYSTEM, INDIVIDUAL AUTHENTICATION METHOD, AND INDIVIDUAL AUTHENTICATION PROGRAM

BACKGROUND OF THE INVENTION

1. Field of the Invention

The present invention relates to an individual authentication based on a physical feature and, more particularly, to prevention of misuse of the data related to the individual physical feature by the third party.

2. Description of the Related Art

Individual authentication that identifies individuals is a basic function of security. Conventional individual authentication systems have generally utilized belongings such as an ID card or memory such as a password. However, the ID card or password is easy to be stolen or cracked, and this remains a significant problem in security and convenience. Under the circumstances, "biometrics" that identifies individuals based on physical information such as face, fingerprint, or voice is getting attention in recent years.

In general, the "biometrics" is performed as follows. Firstly, data of a physical feature for respective individuals are registered in a system. In the case where fingerprints are used for authentication, image data of the fingerprints for respective individuals are acquired from the system. At this time, the data of physical data (fingerprint image, in the case of fingerprint authentication) is not used without modification, but only the data required for authentication is extracted. For example, in the case of a fingerprint, the position or the number of branch points which characterizes the fingerprint is extracted and used for authentication.

At the time of authentication, for example, in the authentication needed to open the door of a security room, data of a physical feature (fingerprint, etc.) is firstly input and data for authentication is extracted as in the case of registration time. After that, the extracted data and registered data are compared to each other. When the similarity obtained as a result of the comparison exceeds a predetermined threshold, the identity is confirmed.

In the case of biometrics, there is no need to carry an object such as an ID card and there is little risk of theft, so that the biometrics is now getting a lot more attention as a technology capable of increasing security. On the other hand, a problem that the features of human body (face, fingerprint, vein, voice, etc.) remain unchanged over the course of one's life and cannot be changed has been pointed out. In the case of a password, even if it is cracked, a change of the password can prevent others from misusing the same password to some extent. However, once the information related to one's physical feature is stolen, a great threat remains from then on since the physical feature cannot be changed. More specifically, there is a risk that others fake up authenticated features based on the leaked data and misuse them. Therefore, strong defense measures are required for the leakage of the physical feature.

In order to cope with the above problem, as a technique of applying various modification to the data of a physical feature to increase security, an authentication method that generates feature information that cannot be guessed from authentication data to be used in authentication and secret information (password) to thereby maintain confidentiality has been disclosed (refer to, for example, Jpn. Pat. Appln. Laid-Open Publication No. 2000-76195). Although the above authentication method can prevent the misuse of the stolen feature data by modifying the physical feature data into a form that cannot be guessed, it cannot eliminate the risk that the data before modification is stolen and the stolen data is misused as a means of ID theft.

Further, another technique in which a part of the biometrics data to be used, the part being determined by a time stamp, is destroyed before authentication process has been disclosed (refer to, for example, Jpn. Pat. Appln. Laid-Open Publication No. 2002-169781). According to this technique, authentication cannot be completed between the data with different time stamps, preventing illegal secondary use. However, application of the modification processing is made after acquisition of the feature data, so that there is a possibility that unprocessed original data is leaked as in the case of the above invention.

Further, still another technique that applies modification (twisting, shuffling image parts, etc.) processing after acquisition of the feature data (face, vein, voice, etc.) for authentication to prevent others from misusing the stolen feature data has been disclosed (refer to, for example, U.S. Pat. No. 6,836,554). According to this technique, it is possible to prevent the misuse of the leaked feature data by applying modification processing to the feature data. However, application of the modification processing is made after acquisition of the feature data, so that there is a possibility that unprocessed original data is stolen and misused as a means of ID theft.

Figure 13:
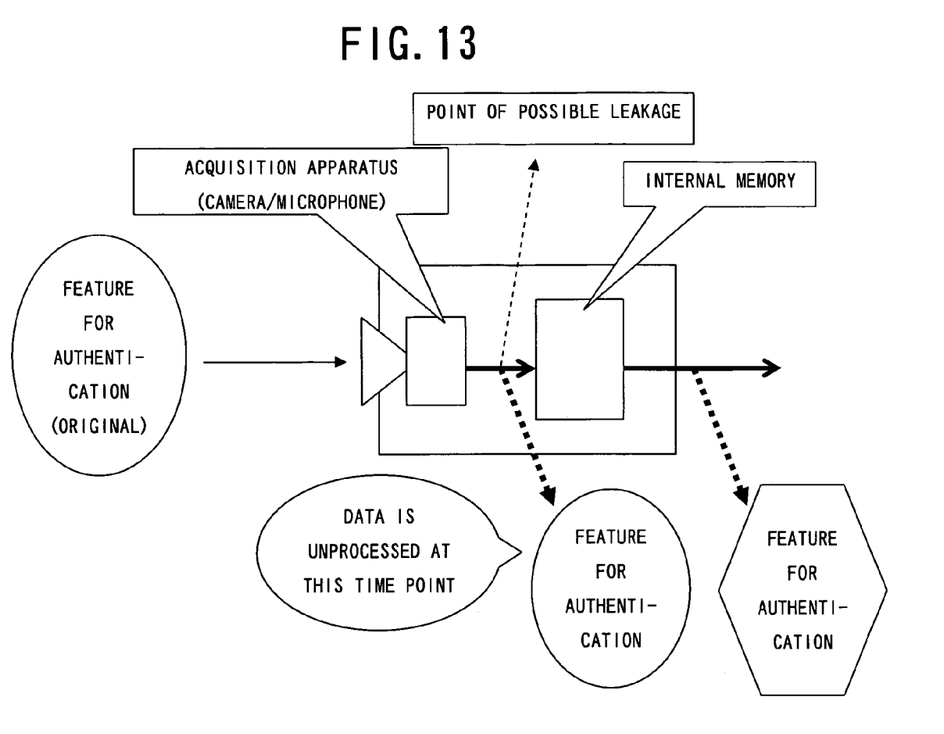
FIG. 13 is a view for explaining a problem in a conventional authentication system.

In the above prior arts, the modification processing is applied after the physical feature data has been stored in an internal memory. Therefore, as far as unprocessed individual feature data exists in an apparatus, the possibility that the feature data is stolen before the modification processing cannot be reduced to 0. For example, the information is likely to be stolen from a signal flowing in a cable connecting an apparatus for acquiring the feature data for authentication and another apparatus for performing authentication process (refer to FIG. 13). Further, there is a risk that a system developer or system manager stoles the unprocessed feature data for the purpose of reselling the personal information. Therefore, the time period in which the unprocessed original data is handled needs to be reduced as much as possible.

SUMMARY OF THE INVENTION

The present invention has been made to solve the above problem, and an object thereof is to provide a technique capable of easily preventing the third party from misusing the data related to an individual physical feature in the case where individual authentication is performed based on the physical feature.

To solve the above problem, according to a first aspect of the present invention, there is provided an individual authentication system that authenticates an individual based on his or her physical feature, comprising: an authentication information acquisition section that acquires, at the time of authentication of an individual, information related to a state in which predetermined processing has applied to predetermined physical feature of the individual as authentication information for authentication determination; a registration information acquisition section that acquires the previously registered information related to a state in which predetermined processing has applied to predetermined individual physical feature as registration information for authentication; and an authentication determination section that determines authentication of the authentication information acquired by the authentication information acquisition section based on the registration information acquired by the registration information acquisition section.

In the individual authentication system according to the present invention, the authentication information and registration information are based on a photographed image of the individual, and the predetermined processing is performed by applying optical processing to the photographed object at the time of photographing the image of the physical feature.

In the individual authentication system according to the present invention, the predetermined processing is performed by giving brightness distribution to the photographed object.

In the individual authentication system according to the present invention, the predetermined processing is performed by adding photographed image for processing to the photographed object.

In the individual authentication system according to the present invention, the predetermined processing is performed by optically deforming the photographed object.

In the individual authentication system according to the present invention, the authentication information and registration information are based on voice of the individual, and the predetermined processing is performed by adding voice for processing to the voice.

The individual authentication system according to the present invention further comprises an identification information acquisition section that acquires information for identification associated with an individual to be authenticated, wherein the predetermined processing is performed according to a predetermined processing method that has previously been set in association with the information for identification acquired by the identification information acquisition section.

The individual authentication system according to the present invention further comprises a processing section that applies predetermined processing to a predetermined physical feature of an individual, wherein the predetermined processing is made different for each authentication system.

According to a second aspect of the present invention, there is provided an individual authentication method that authenticates an individual based on his or her physical feature, comprising: an authentication information acquisition step that acquires, at the time of authentication of an individual, information related to a state in which predetermined processing has applied to predetermined physical feature of the individual as authentication information for authentication determination; a registration information acquisition step that acquires the previously registered information related to a state in which predetermined processing has applied to predetermined individual physical feature as registration information for authentication; and an authentication determination step that determines authentication of the authentication information acquired in the authentication information acquisition step based on the registration information acquired in the registration information acquisition step.

In the individual authentication method according to the present invention, the authentication information and registration information are based on a photographed image of the individual, and the predetermined processing is performed by applying optical processing to the photographed object at the time of photographing the image of the physical feature.

In the individual authentication method according to the present invention, the predetermined processing is performed by giving brightness distribution to the photographed object.

In the individual authentication method according to the present invention, the predetermined processing is performed by adding photographed image for processing to the photographed object.

In the individual authentication method according to the present invention, the predetermined processing is performed by optically deforming the photographed object.

In the individual authentication method according to the present invention, the authentication information and registration information are based on voice of the individual, and the predetermined processing is performed by adding voice for processing to the voice.

In the individual authentication method according to the present invention, the predetermined processing is applied at least a part of the predetermined physical feature.

The individual authentication method according to the present invention further comprises an identification information acquisition step that acquires information for identification associated with an individual to be authenticated, wherein the predetermined processing is performed according to a predetermined processing method that has previously been set in association with the information for identification acquired in the identification information acquisition step.

According to a third aspect of the present invention, there is provided an individual authentication program allowing a computer to execute authentication of an individual based on his or her physical feature, the program allowing the computer to execute: an authentication information acquisition step that acquires, at the time of authentication of an individual, information related to a state in which predetermined processing has applied to predetermined physical feature of the individual as authentication information for authentication determination; a registration information acquisition step that acquires the previously registered information related to a state in which predetermined processing has applied to predetermined individual physical feature as registration information for authentication; and an authentication determination step that determines authentication of the authentication information acquired in the authentication information acquisition step based on the registration information acquired in the registration information acquisition step.

In the individual authentication program according to the present invention, the authentication information and registration information are based on a photographed image of the individual, and the predetermined processing is performed by applying optical processing to the photographed object at the time of photographing the image of the physical feature.

In the individual authentication program according to the present invention, the predetermined processing is applied at least a part of the predetermined physical feature.

The individual authentication program according to the present invention further comprises an identification information acquisition step that acquires information for identification associated with an individual to be authenticated, wherein the predetermined processing is performed according to a predetermined processing method that has previously been set in association with the information for identification acquired in the identification information acquisition step.

As described above in detail, according to the present invention, it is possible to provide a technique capable of easily preventing the third party from misusing the data related to an individual physical feature in the case where individual authentication is performed based on the physical feature.

DETAILED DESCRIPTION OF THE PREFERRED EMBODIMENTS

Embodiments of the present invention will be described below with reference to the accompanying drawings.

First Embodiment

Figure 1:
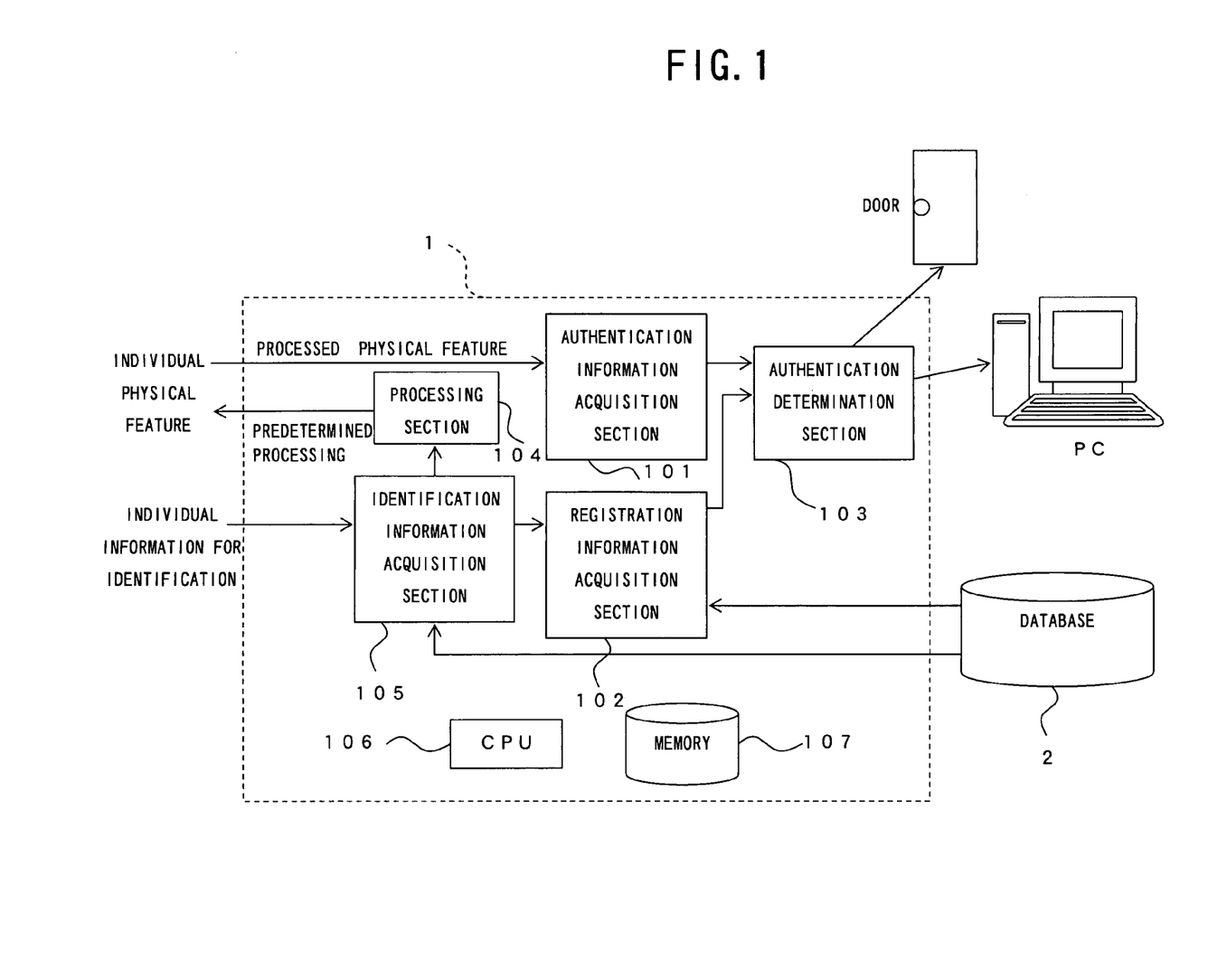
FIG. 1 is a functional block diagram for explaining an individual authentication system according to a first embodiment of the present invention.

FIG. 1 is a functional block diagram for explaining an individual authentication system according to a first embodiment of the present invention.

An individual authentication system according the first embodiment authenticates an individual based on a physical feature. The individual authentication system includes an authentication information acquisition section 101, a registration information acquisition section 102, an authentication determination section 103, a processing section 104, an identification information acquisition section 105, a CPU 106, a memory 107, and a database 2.

Here, an authentication apparatus 1 is constituted by the authentication information acquisition section 101, registration information acquisition section 102, authentication determination section 103, processing section 104, identification information acquisition section 105, CPU 106, and memory 107. The database 2 is connected to the authentication apparatus 1 through an electrical line such as LAN in a communicable manner.

The processing section 104 has a role of applying predetermined processing to a predetermined physical feature of an individual to be authenticated.

The identification information acquisition section 105 has a role of acquiring information for identification such as ID number or name associated with an individual to be authenticated.

The authentication information acquisition section 101 has a role of acquiring, at the time of authentication of an individual, information related to a state in which predetermined processing has applied to predetermined individual physical feature by the processing section 104 as authentication information for authentication determination of individual identity.

The registration information acquisition section 102 has a role of acquiring information related to a state in which predetermined processing has applied to predetermined individual physical feature from the database 2 in which the information has previously been stored, as registration information for authentication.

The authentication determination section 103 has a role of determining authentication of the authentication information acquired by the authentication information acquisition section 101 based on the registration information acquired by the registration information acquisition section 102. Here, when the authentication information acquired by the authentication information acquisition section 101 is authenticated in the authentication determination section 103, door lock is released, or login to a PC is permitted.

The CPU 106 has a role of performing various processing in the individual authentication system. The CPU 106 has another role of executing a program stored in the memory 107 to realize various functions. The memory 107 is constituted by, for example, an ROM or RAM and has a role of storing various information and programs used in the individual authentication system.

Although the database 2 is disposed outside of the authentication apparatus in the first embodiment, it may be disposed in the authentication apparatus.

Figure 2:
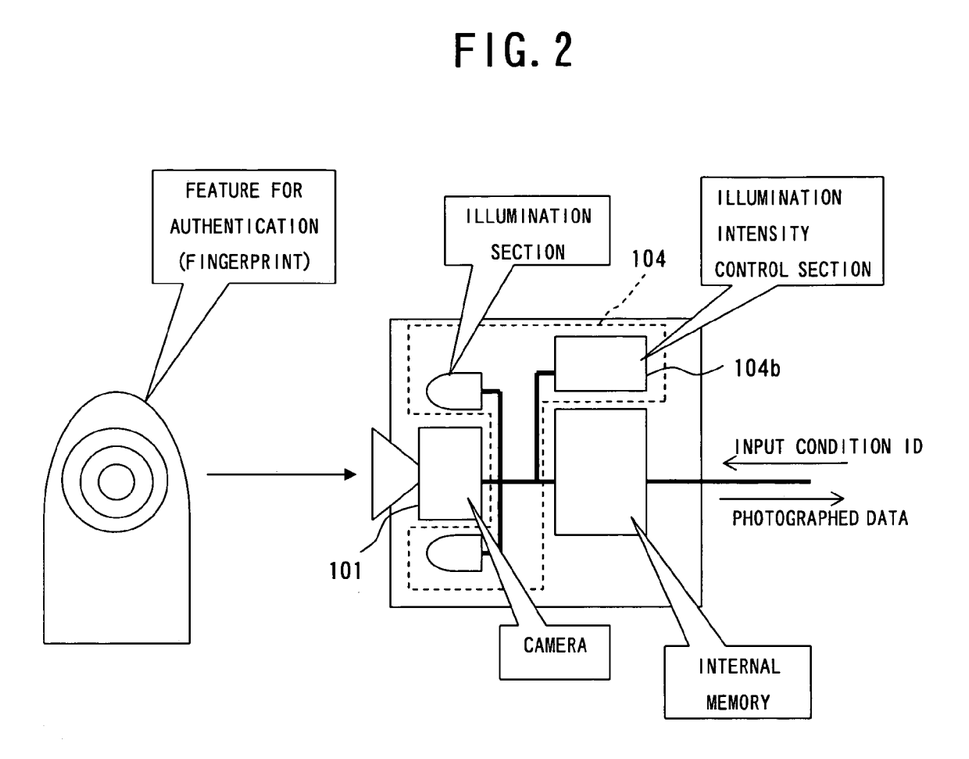
FIG. 2 is a view for explaining, as a concrete example of the first embodiment, the case where a "fingerprint" is used as a physical feature for authentication.

FIG. 2 is a view for explaining, as a concrete example of the first embodiment, the case where a "fingerprint" is used as a physical feature for authentication. Here, the authentication information acquisition section 101 is constituted by a photographing section such as a CCD camera, and the processing section 104 is constituted by a plurality of LEDs (LEDs 1 to 4) serving as a illumination section and illumination intensity control section 104b that controls the illumination intensity of the illumination section. The illumination intensity control section 104b can individually control the emission intensity of the plurality of LEDs (LEDs 1 to 4). That is, in this example, authentication information is based on the photographed image, and the illumination section illuminates a part of the physical feature of the individual which is an object of the photographing at the time of photographing performed by the photographing section while changing an illumination mode, thereby performing the predetermined processing.

Figure 3:
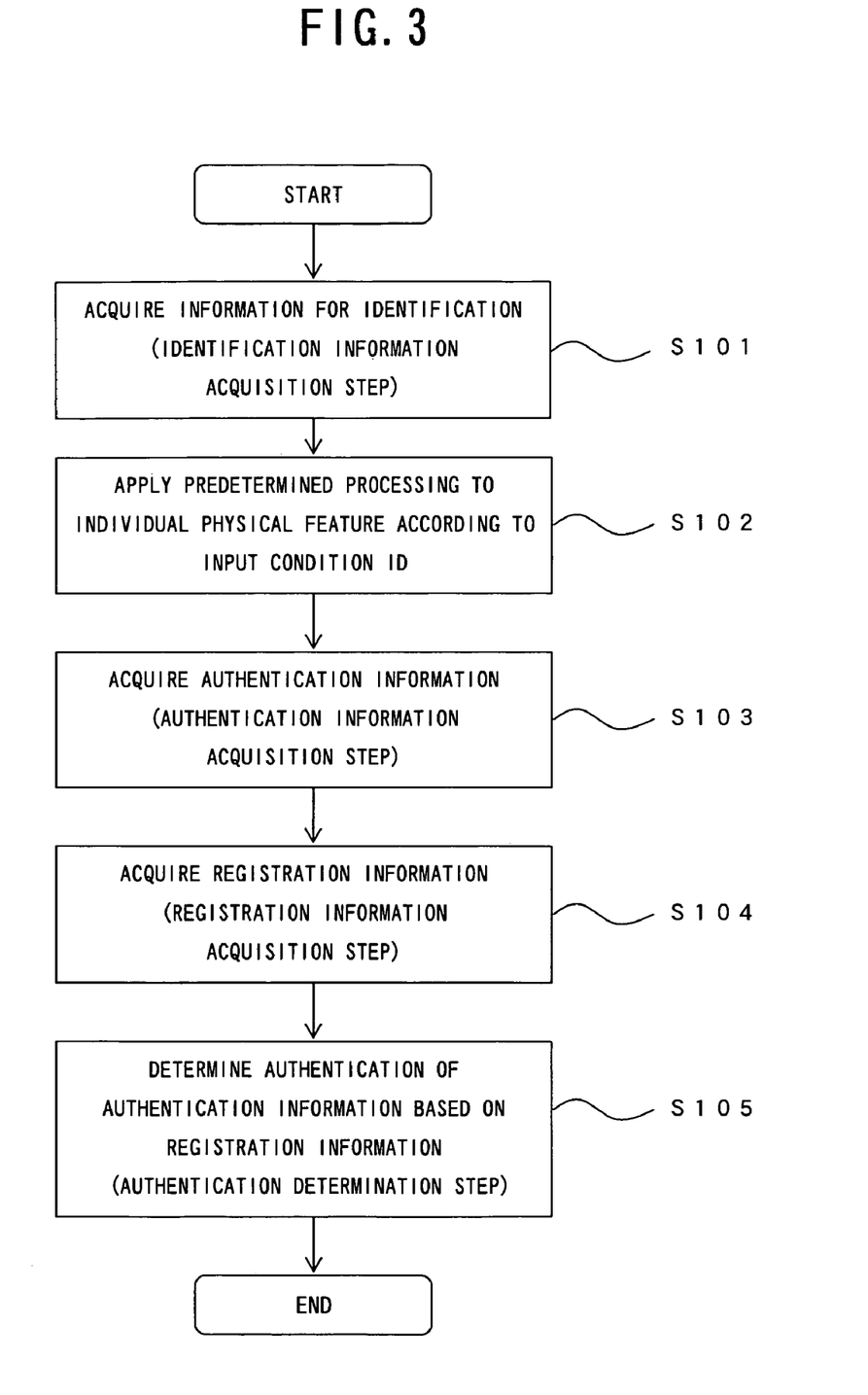
FIG. 3 is a flowchart for explaining a process flow (individual authentication method) in the individual authentication system according to the first embodiment.

FIG. 3 is a flowchart for explaining a process flow (individual authentication method) in the individual authentication system according to the first embodiment. The following description will be made taking the case where the ID of an individual to be authenticated is previously known (=1:1 authentication) as an example.

"Input condition ID" has been associated with the information for identification such as ID of an individual to be authenticated. The "input condition ID" is ID that indicates unique acquisition condition needed when the authentication information acquisition section 101 acquires the authentication information. Here, the distribution pattern of the illumination intensity of the illumination section is defined. Information related to a correspondence between the individual ID information and "input condition ID" is stored in the database 2. Although the "input condition ID" has a unique value for each individual, it is not always necessary to assign different values to all individuals.

The "input condition ID" may be obtained by computation in which it is uniquely determined from the individual ID information or the like, or may be determined based on random numbers generated at the time when the "input condition ID" is registered in the database 2.

Further, as one of the methods for determining the "input condition ID" in the individual authentication apparatus 1, a method using registration time is available. In this method, the time when the registration is started is acquired on the second time scale and the input condition ID is determined based on the time. More specifically, a remainder obtained by dividing the registration start time by 4 is acquired, 1 is added to the acquired value, and the result is set as input condition ID.

Figure 4:
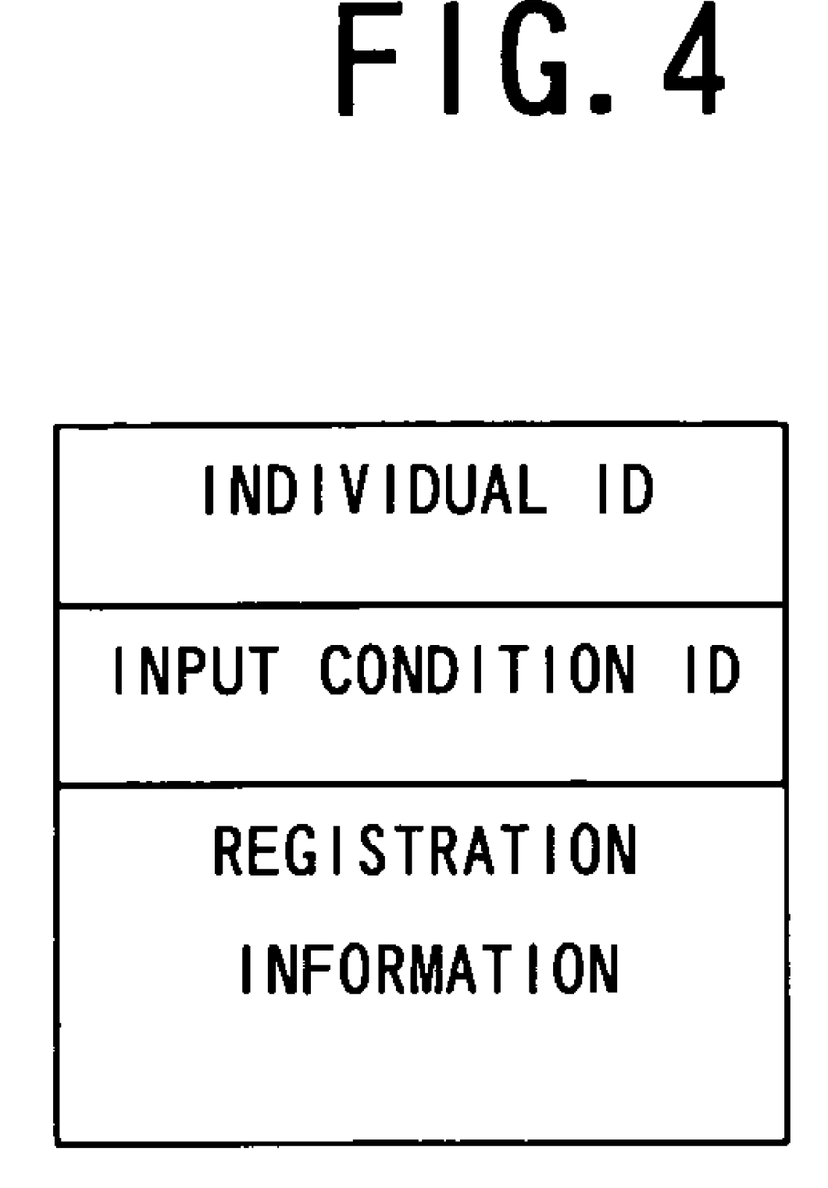
FIG. 4 is a view for explaining a correspondence between an individual ID, an input condition ID, and registration information in the individual authentication system according to the first embodiment.

As described above, in the individual authentication system according to the first embodiment, (1) individual ID for uniquely identifying an individual, (2) input condition ID for uniquely indicating the processing condition for the physical feature at the time of acquiring the authentication information, and (3) registration information for authentication are stored in the database 2 for each individual to be authenticated, as shown in FIG. 4. The registration information is the data related to the physical feature of each individual for use in authentication. In this example, the registration information is unique fingerprint information extracted from the photographed image of the fingerprint that has been subjected to predetermined processing according to the input condition ID associated with the individual ID.

Firstly, the identification information acquisition section 105 acquires information for identification associated with an individual to be authenticated by reading out ID information from an ID card of the individual (identification information acquisition step) (S101).

Subsequently, the processing section 104 applies optical processing to the photographed image of the fingerprint (physical feature) of an individual to be authenticated by giving a predetermined pattern of brightness distribution thereto at the time of photographing according to predetermined processing method determined based on the input condition ID that has previously been set/registered in the database 2 in association with the information for identification (individual ID) acquired by the identification information acquisition step (S102).

Figure 5:
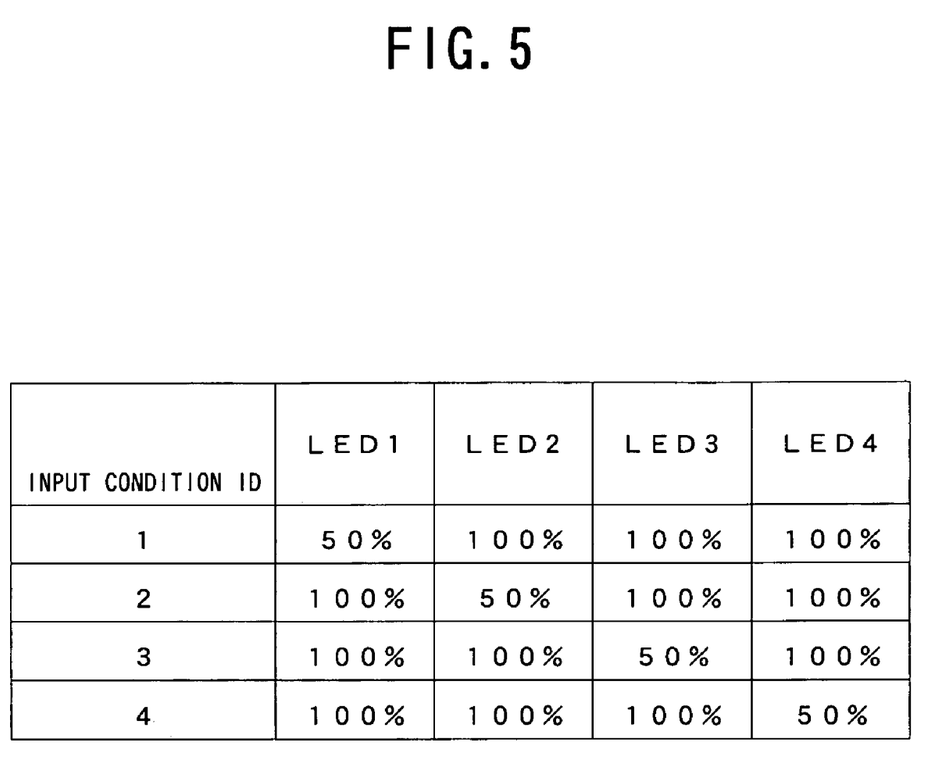
FIG. 5 is a view showing a setting of illumination intensity of LEDs 1 to 4 (illumination section), which is associated with the "input condition ID"

FIG. 5 is a view showing a setting of illumination intensity of LEDs 1 to 4 (illumination section), which is associated with the "input condition ID". The illumination intensity control section 104b individually controls the illumination intensity of the LEDs based on the input condition ID corresponding to the information for identification of an individual to be authenticated. For example, when the input condition ID is "1", the illumination intensity control section 104b set the output of the LED 1 to 50% and the outputs of other LEDs to 100% followed by photographing of the physical feature by the photographing section.

Figure 6:
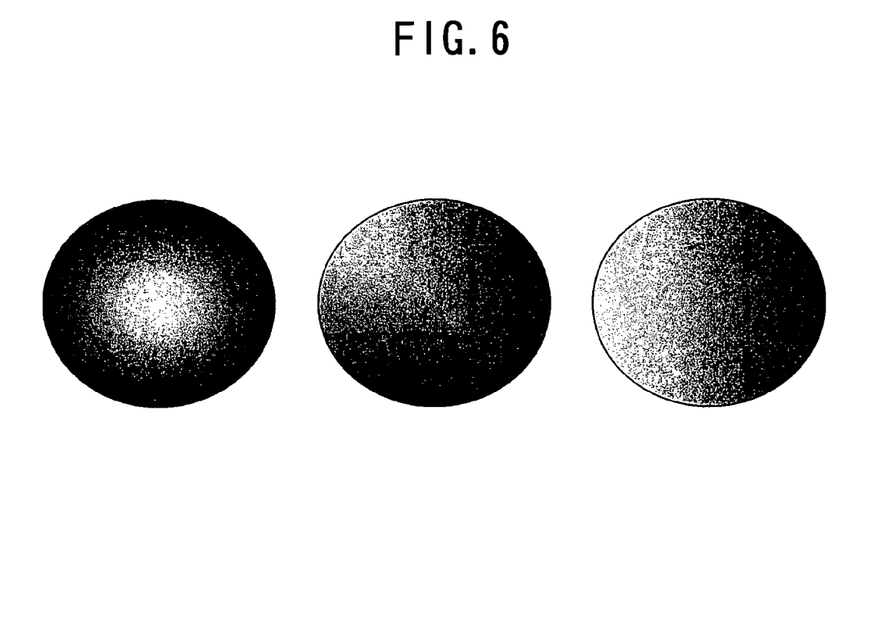
FIG. 6 is a view for explaining distribution of illumination intensity (brightness distribution)

In the case where the photographing is performed by irradiating the physical feature with lights of the plurality of LEDs, it is possible to make the intensity distribution (brightness distribution) of the illumination uneven as shown in FIG. 6 by controlling the intensity of respective LEDs. Although an object is illuminated with a uniform light at the time of photographing in general, the illumination intensity is intentionally made uneven in this case.

Subsequently, the authentication information acquisition section 101 takes an image of the fingerprint (predetermined physical feature) of an individual to be authenticated, the fingerprint being illuminated with the brightness distribution as described above (a state in which predetermined processing is applied) and acquires the number of branch points of the fingerprint or the like from the taken fingerprint image (authentication information for authentication determination) (authentication information acquisition step) (S103).

The registration information acquisition section 102 acquires, using individual ID as a key, information related to a state in which predetermined processing has applied to predetermined individual physical feature from the database 2 in which the information has previously been stored in the manner as described above, as registration information for authentication (S104).

The authentication determination section 103 determines authentication of the authentication information acquired in the authentication information acquisition step based on the registration information acquired in the registration information acquisition step (authentication determination step) (S105). More specifically, the authentication determination section 103 compares the registration information stored in the database 2 and authentication information and calculates similarity that indicates how much the both correspond to each other. When the calculated similarity exceeds a predetermined threshold, the relevant individual is authenticated and, for example, door lock is released, or login to a PC is permitted.

The respective steps of the process (individual authentication method) in the above individual authentication system is realized by allowing the CPU 106 to execute an individual authentication program stored in the memory 107.

As described above, in the case where there is variation in the intensity distribution of the illumination, it becomes difficult to extract the authentication feature (=pattern or the like of the fingerprint, in the case of fingerprint authentication) in dark region, so that the authentication information different from the case where uniform illumination is used is obtained. Therefore, in the case of an individual with whom the input condition ID of a certain illumination intensity pattern has been associated, his or her physical feature needs to be photographed with the same illumination intensity distribution at the authentication time, or correspondence cannot be made in the authentication process.

Figure 7:
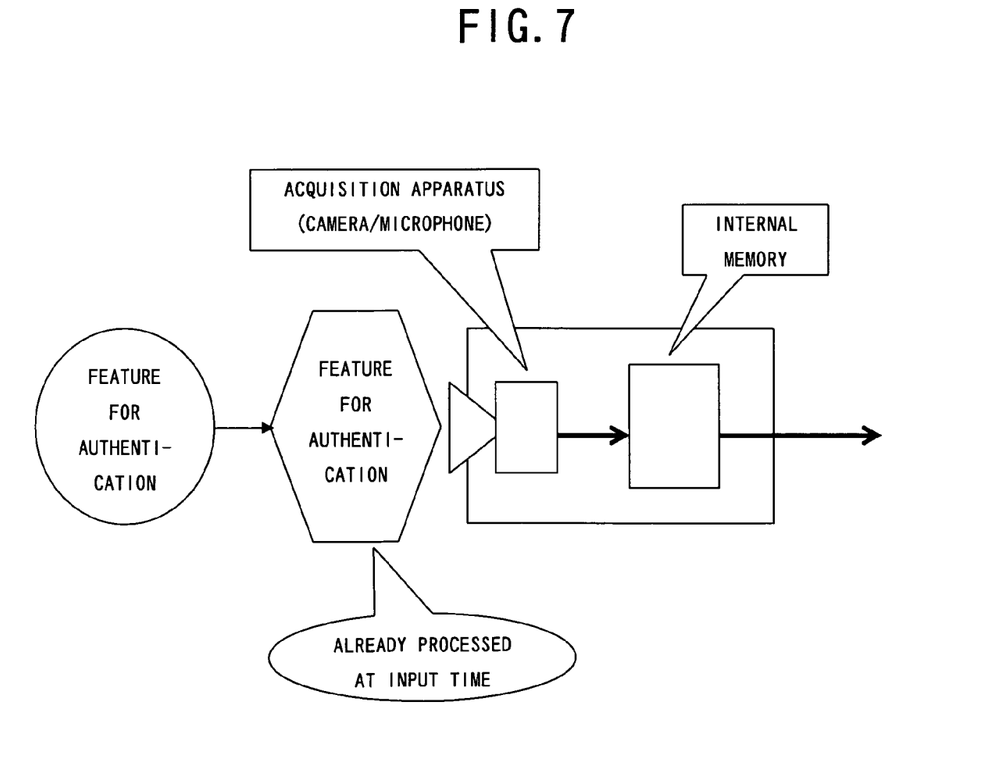
FIG. 7 is a view for explaining avoidance of misuse of authentication information.
Figure 8:
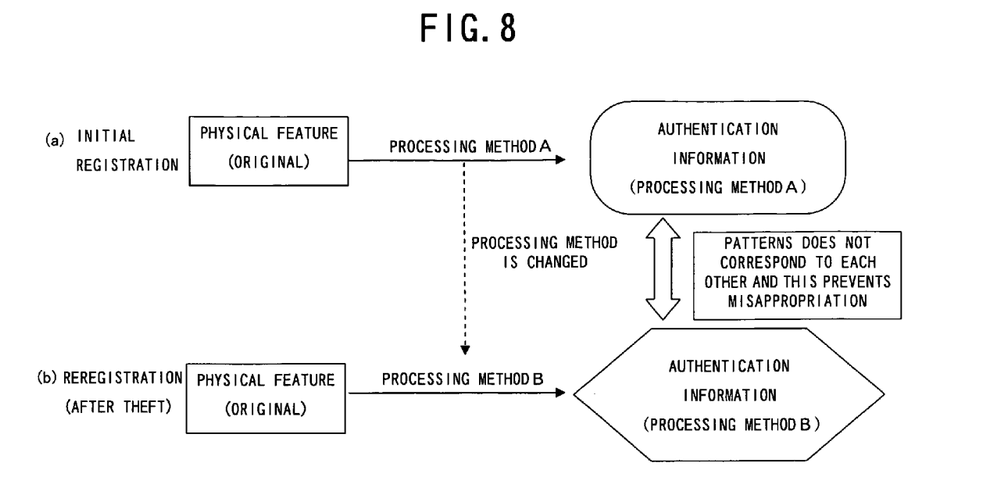
FIG. 8 is a view for explaining avoidance of misuse of authentication information.

As described above, at the time point when acquiring data related to the physical feature of an individual to be authenticated, the data has been subjected to predetermined processing. With this configuration, even if authentication information (information in a state in which predetermined processing has applied to predetermined individual physical feature) is stolen, it is possible to prevent the third party from misusing the stolen authentication information by changing the input condition ID (illumination distribution pattern) of the relevant individual for reregistration (refer to FIGS. 7 and 8).

When the above authentication program is stored in a computer-readable storage medium, it is possible to allow the computers constituting a communication terminal and a communication control apparatus to execute the authentication program. The computer-readable storage medium mentioned here includes: a portable storage medium such as a CD-ROM, a flexible disk, a DVD disk, a magneto-optical disk, or an IC card; an internal storage device mounted inside the computer, such as ROM, RAM, or magnetic storage device, a database that holds computer program; and another computer and database thereof.

Although the fingerprint authentication has been performed in authentication process in the above embodiment, the present invention is not limited to this. The physical feature that can serve as a target of authentication process in the above embodiment includes, for example, face, blood flow, iris, retina, handprint, lines of the palm, and ear shape.

Second Embodiment

A second embodiment of the present invention will next be described.

The second embodiment is a modification of the first embodiment and differs from it in a method of the predetermined processing applied to the physical feature. In this embodiment, the same reference numerals as the first embodiment are given to the components which are common to the first embodiment, and the overlapped description is omitted.

Figure 9:
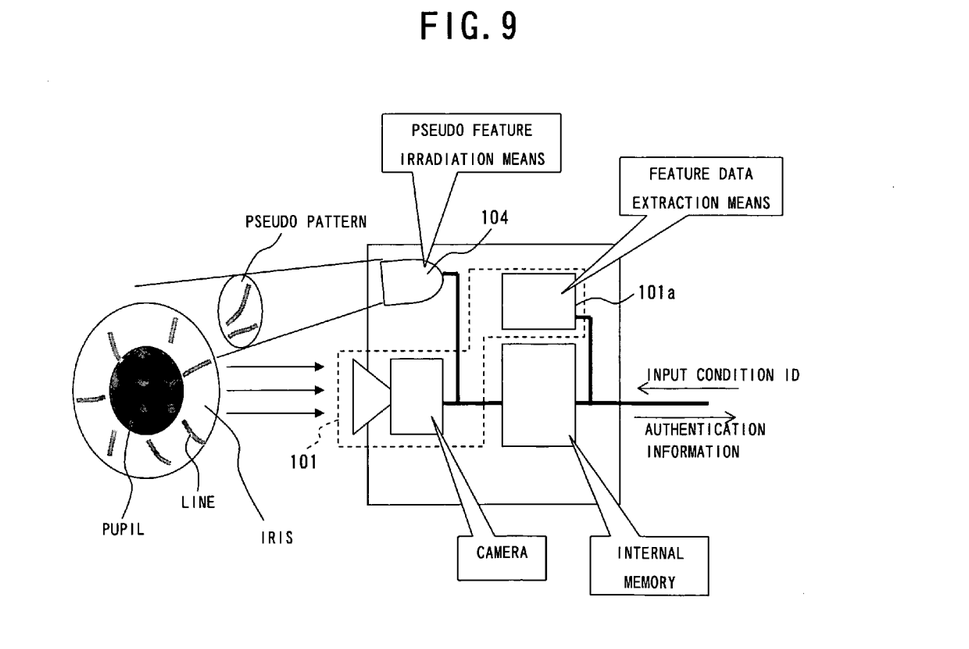
FIG. 9 is a view for explaining a second embodiment of the present invention.

In the second embodiment, a pseudo feature irradiation section 104 that projects feature used for authentication upon the physical feature of an individual to be authenticated is used as the processing section 104 (refer to FIG. 9). For example, in the case where the physical feature used for authentication is iris, authentication process is performed based on a pattern of muscle lines in the iris part of an eye. At this time, the authentication information acquisition section 101 takes an image of the iris while projecting pseudo pattern like the iris lines upon the iris of an individual to be authenticated.

By projecting the pseudo pattern upon the physical feature (adding photographed image for processing to the photographing object) as described above, a feature pattern in which a genuine iris pattern and projected pseudo pattern are mixed is obtained. As a result, authentication information different from the case where a feature point is extracted from the original physical feature is obtained.

The iris image of an individual to be authenticated upon which the pseudo feature irradiation section (processing section) 104 has projected the pseudo pattern is acquired (photographed) by the authentication information acquisition section 101. The acquired iris image data is then temporarily stored in an internal memory. After that, a data extraction section 101a extracts only the feature data needed for authentication from the data of the iris image. As described above, in the second embodiment, not the image data of the photographed physical feature itself, but the feature data used for authentication is extracted, thereby reducing the size of authentication information related to the physical feature to be handled. Further, this configuration is more preferable in terms of security than the configuration in which the acquired individual authentication information is handled without modification.

After extracting the feature data of an individual to be authenticated, the data extraction section 101a transmits the extracted feature data to the authentication determination section 103 as authentication information.

In this embodiment, a plurality of pseudo line patterns to be projected on the iris of an individual to be authenticated are prepared and registered in the database 2 in association with the input condition ID. The pseudo feature irradiation section (processing section) 104 switches the projecting pseudo pattern depending on the input condition ID associated with an individual to be authenticated.

Although the iris authentication has been performed in authentication process in the second embodiment, the present invention is not limited to this. The physical feature that can serve as a target of authentication process in the second embodiment includes, for example, face, blood flow, fingerprint, retina, handprint, lines of the palm, and ear shape.

Third Embodiment

A third embodiment of the present invention will next be described.

The third embodiment is a modification of the first embodiment and differs from it in a physical feature used for individual authentication and a method of the predetermined processing applied to the physical feature. In this embodiment, the same reference numerals as the first embodiment are given to the components which are common to the first embodiment, and the overlapped description is omitted.

In the third embodiment, voice is used for authentication (authentication information and registration information are based on individual voice). Here, in order to add voice for processing to the voice as a physical feature of an individual to be authentication, a processing voice transmission section (processing section) 104 is used (refer to FIG. 10).

Figure 10:
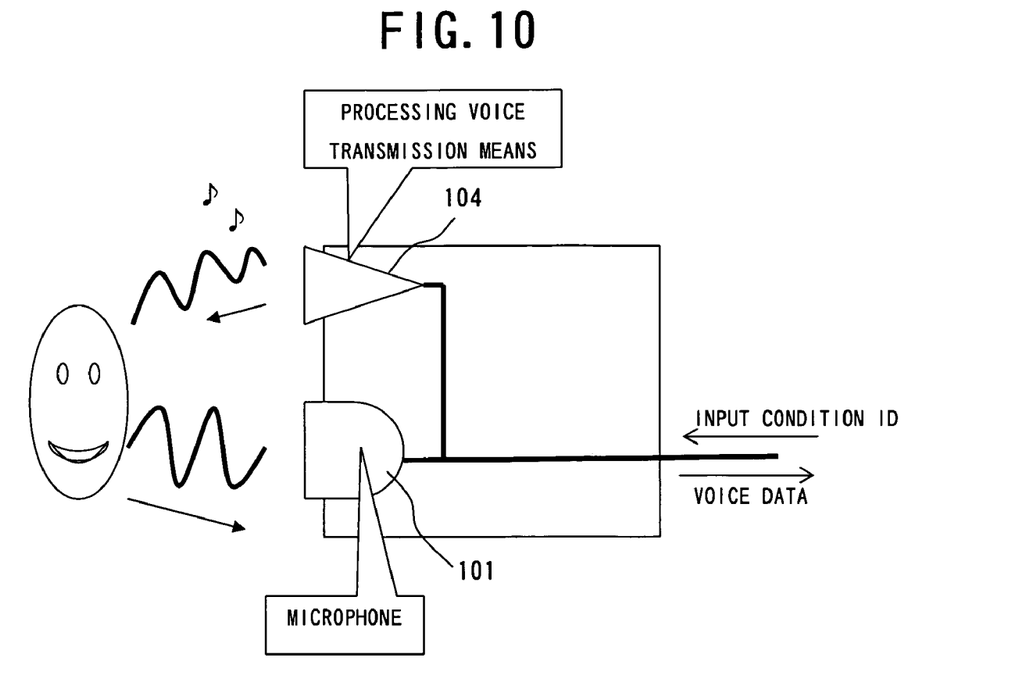
FIG. 10 is a view for explaining a third embodiment of the present invention.

The processing voice transmission section 104 outputs processing voice such as predetermined music, voice or noise depending on the input condition ID associated with an individual to be authenticated. When voice for authentication is released from an individual to be authenticated, the processing voice transmission section 104 transmits (applies predetermined processing) voice for processing. As a result, voice of an individual to be authenticated and voice for processing are mixed and recorded by the microphone 101 as the authentication information acquisition section. The voice data recorded by the microphone 101 is transmitted to the authentication determination section 103 as authentication information.

Fourth Embodiment

A fourth embodiment of the present invention will next be described.

The fourth embodiment is a modification of the first embodiment and differs from it in a method of the predetermined processing applied to the physical feature. In this embodiment, the same reference numerals as the first embodiment are given to the components which are common to the first embodiment, and the overlapped description is omitted.

Figure 11:
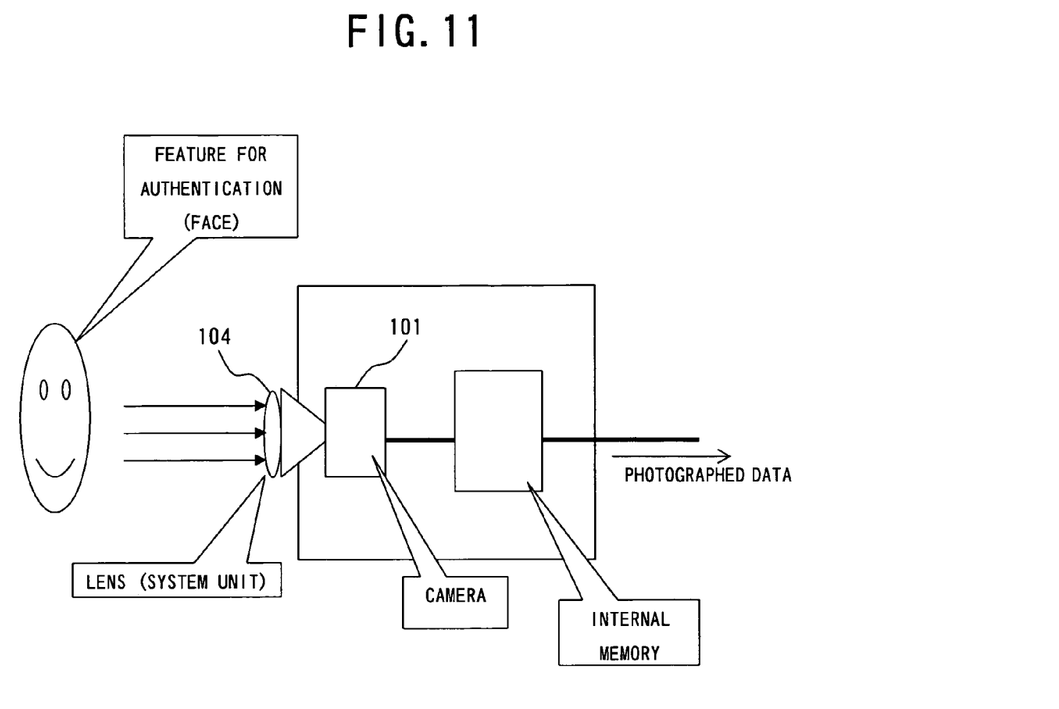
FIG. 11 is a view for explaining a fourth embodiment of the present invention.

In the fourth embodiment, authentication information and registration information are based on a photographed image of an individual. A lens (processing section) 104 used in the authentication information acquisition section 101 that constitutes a CCD camera or the like is used to apply predetermined processing to a physical feature by giving distortion or variation of brightness distribution to an image of an individual physical feature at the time of photographing of the physical feature (face, etc.) of the individual to be authenticated to optically deform the photographing target (refer to FIG. 11). Thus, it is possible to obtain feature data different from the original physical feature of the individual to be authenticated.

With the above configuration, it is possible to change the degree of distortion or variation of brightness distribution of an image to be photographed by changing the lens.

Figure 12:
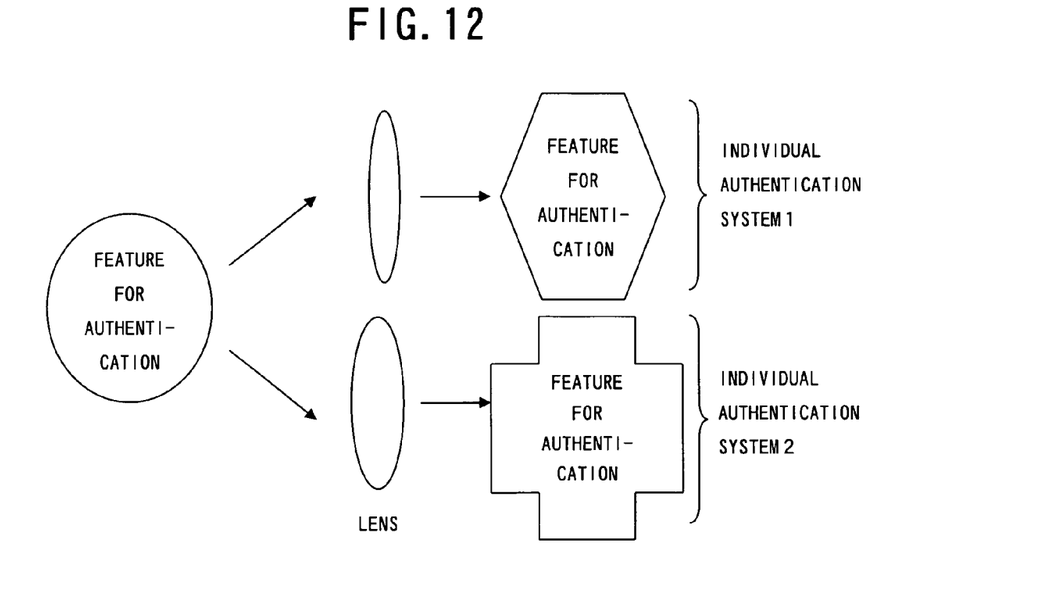
FIG. 12 is a view for explaining a setting of a predetermined processing method in the fourth embodiment.

In the forth embodiment, unlike the abovementioned embodiments in which a predetermined processing method is changed depending on the input condition ID, the lens used in the authentication information acquisition section 101 is changed for each individual authentication system (for example, optical characteristics of the lenses are made different between an individual authentication system 1 and individual authentication system 2) (refer to FIG. 12). Although processing methods applied to the physical feature cannot be switched for each individual in this configuration, it is not necessary to perform illumination of a plurality of patterns, allowing the individual authentication system to be established at low cost.

Although the face authentication has been performed in the fourth embodiment, the present invention is not limited to this. The physical feature that can serve as a target of authentication process in the fourth embodiment includes, for example, iris, blood flow, fingerprint, retina, handprint, lines of the palm, and ear shape.

Although data related to the individual physical feature is acquired after application of predetermined processing thereto in the above embodiments, it is not always necessary to apply the predetermined processing to the entire physical feature but the predetermined processing may be applied to a part of the physical feature.

In the present invention, feature data related to the physical feature (face, fingerprint, or voice) used in the individual authentication has already been subjected to predetermined processing at the time of acquisition, so that it is possible to prevent others from misusing the feature data even if it is leaked.

By changing the processing method for each system or individual in the actual operation time, it is possible to make the system robust against the leak of the feature data. Firstly, by changing the processing method for each operation system, it is possible to prevent misapplication of the leaked feature between systems. For example, even if feature data for entering/leaving room of a company A is leaked, it is impossible to misuse the data for entering/leaving room of a company B. Further, reregistration can be performed when the leak of feature data comes to light to make the current registration data invalid, with the result that new feature data can safely be used.

Further, by changing the processing method for each individual, it is possible to establish a system secure against the leak of the feature data. For example, it is determined that there is a risk that the feature data of an individual has been leaked for reasons such as loss of an IC card that holds the feature data, reregistration is performed with the processing method for the relevant individual changed, thereby preventing others from misusing the leaked data without influencing other user.

As a matter of course, it is possible to combine the above techniques to change the processing method for each operation system and each individual (for example, the lens for photographing is changed for each individual authentication system, and illumination intensity distribution is changed for each individual), thereby establishing a system having a higher security level.

Further, according to the above embodiments, feature data related to the physical feature of an individual to be authenticated has already been subjected to predetermined processing at the time of acquisition, so that it is possible to eliminate entirely the possibility that the unprocessed predetermined feature data is leaked.

While the present invention has been described using specified embodiments, it will be appreciated by those skilled in the art that the invention may be changed or reformed without departing from the spirit and scope of the invention.

What is claimed is:

1. An individual authentication system that authenticates an individual based on his or her physical feature, comprising:
   a processing section that applies a predetermined processing to a physical feature of a target individual for authentication determination;
   an authentication information acquisition section that directly detects the physical feature to which the predetermined processing is applied so as to acquire authentication information for authentication determination;
   a registration information acquisition section that acquires the previously registered information related to a state in which the predetermined processing has been applied to a physical feature of an individual as registration information for authentication; and
   an authentication determination section that determines authentication of the authentication information acquired by the authentication information acquisition section based on the registration information acquired by the registration information acquisition section.

2. The individual authentication system according to claim 1, wherein
   the authentication information is based on a photographed image of the target individual,
   the registration information is based on a photographed image of the individual, and
   the predetermined processing is applied to the physical feature of the target individual so that the photographed image of the target individual is optically processed.

3. The individual authentication system according to claim 1, wherein
   the predetermined processing is applied to the physical feature of the target individual so that brightness distribution is given on the physical feature of the target individual.

4. The individual authentication system according to claim 1, wherein
   the predetermined processing is applied to the physical feature of the target individual so that a specified photographed image is added on the physical feature of the target individual.

5. The individual authentication system according to claim 1, wherein
   the predetermined processing is applied to the physical feature of the target individual so that the physical feature of the target individual is optically deformed.

6. The individual authentication system according to claim 1, wherein
   the authentication information is based on voice of the target individual,
   the registration information is based on voice of the individual, and
   the predetermined processing is specified voice.

7. The individual authentication system according to claim 1, further comprising an identification information acquisition section that acquires information for identification associated with the target individual, wherein a type of the predetermined processing is determined according to a predetermined processing method that has previously been set in association with the information for identification acquired by the identification information acquisition section.

8. The individual authentication system according to claim 1, wherein a type of the predetermined processing is different for each authentication system.

9. An individual authentication method that authenticates an individual based on his or her physical feature, the method comprising:
   applying a predetermined processing to a physical feature of a target individual for authentication determination;
   directly detecting the physical feature to which the predetermined processing is applied so as to acquire authentication information for authentication determination;
   acquiring the previously registered information related to a state in which the predetermined processing has been applied to a physical feature of an individual as registration information for authentication; and determining authentication of the authentication information based on the acquired registration information.

10. The individual authentication method according to claim 9, wherein
the authentication information is based on a photographed image of the target individual,
the registration information is based on a photographed image of the individual, and
the predetermined processing is applied to the physical feature of the target individual so that the photographed image of the target individual is optically processed.

11. The individual authentication method according to claim 9, wherein
the predetermined processing is applied to the physical feature of the target individual so that brightness distribution is given on the physical feature of the target individual.

12. The individual authentication method according to claim 9, wherein
the predetermined processing is applied to the physical feature of the target individual so that a specified photographed image is added on the physical feature of the target individual.

13. The individual authentication method according to claim 9, wherein
the predetermined processing is applied to the physical feature of the target individual so that the physical feature of the target individual is optically deformed.

14. The individual authentication method according to claim 9, wherein
the authentication information is based on voice of the target individual,
the registration information is based on voice of the individual, and
the predetermined processing is specified voice.

15. The individual authentication method according to claim 9, wherein
the predetermined processing is applied to at least a part of the physical feature.

16. The individual authentication method according to claim 9, further comprising obtaining information for identification associated with the target individual, wherein a type of the predetermined processing is determined according to a predetermined processing method that has previously been set in association with the information for identification obtained.

17. A computer-readable medium storing a program, which when executed by a computer, causes the computer to execute a method for authentication of an individual based on his or her physical feature, the method comprising:
applying a predetermined processing to a physical feature of a target individual for authentication determination;
directly detecting the physical feature to which the predetermined processing is applied so as to acquire authentication information for authentication determination;
acquiring the previously registered information related to a state in which the predetermined processing has been applied to a physical feature of an individual as registration information for authentication; and
determining authentication of the authentication information acquired based on the acquired registration information.

18. The computer-readable medium according to claim 17, wherein
the authentication information is based on a photographed image of the target individual,
the registration information is based on a photographed image of the individual, and
the predetermined processing is applied to the physical feature of the target individual so that the photographed image of the target individual is optically processed.

19. The computer-readable medium according to claim 17, wherein
the predetermined processing is applied to at least a part of the physical feature.

20. The computer-readable medium according to claim 17, wherein the method further comprises obtaining information for identification associated with the target individual, wherein a type of the predetermined processing is determined according to a predetermined processing method that has previously been set in association with the obtained information for identification.

* * * * *

UNITED STATES PATENT AND TRADEMARK OFFICE
CERTIFICATE OF CORRECTION

| | | |
|---|---|---|
| PATENT NO. | : 7,613,333 B2 | Page 1 of 1 |
| APPLICATION NO. | : 11/226306 | |
| DATED | : November 3, 2009 | |
| INVENTOR(S) | : Takahiro Aoki | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 994 days.

Signed and Sealed this
Third Day of May, 2011

David J. Kappos
*Director of the United States Patent and Trademark Office*